(12) United States Patent
Chia et al.

(10) Patent No.: US 11,078,862 B2
(45) Date of Patent: Aug. 3, 2021

(54) CALIBRATION OF A PRESSURE SENSOR OF AN INJECTION SYSTEM FOR A MOTOR VEHICLE

(71) Applicant: CPT Group GmbH, Hannover (DE)

(72) Inventors: Tet Kong Brian Chia, Regensburg (DE); Dmitriy Kogan, Roding (DE)

(73) Assignee: VITESCO TECHNOLOGIES GMBH, Hanover (DE)

( * ) Notice: Subject to any disclaimer, the term of this patent is extended or adjusted under 35 U.S.C. 154(b) by 296 days.

(21) Appl. No.: 16/340,202

(22) PCT Filed: May 10, 2017

(86) PCT No.: PCT/EP2017/061184
§ 371 (c)(1),
(2) Date: Apr. 8, 2019

(87) PCT Pub. No.: WO2018/068904
PCT Pub. Date: Apr. 19, 2018

(65) Prior Publication Data
US 2020/0040835 A1 Feb. 6, 2020

(30) Foreign Application Priority Data
Oct. 13, 2016 (DE) .................. 10 2016 219 959.5

(51) Int. Cl.
| F02D 41/20 | (2006.01) |
| F02D 41/24 | (2006.01) |
| F02D 41/22 | (2006.01) |
| F02M 59/02 | (2006.01) |
| F02M 59/36 | (2006.01) |

(52) U.S. Cl.
CPC ......... *F02D 41/20* (2013.01); *F02D 41/2403* (2013.01); *F02D 2041/2055* (2013.01);
(Continued)

(58) Field of Classification Search
CPC ................ F02D 41/20; F02D 41/2403; F02D 2041/2055; F02D 2041/223;
(Continued)

(56) References Cited

U.S. PATENT DOCUMENTS

| 7,596,447 B2 | 9/2009 | Oono ............................ 701/114 |
| 7,933,712 B2 | 4/2011 | Ishizuka et al. ............... 701/114 |

(Continued)

FOREIGN PATENT DOCUMENTS

| CN | 101377161 A | 3/2009 | ............. F02D 41/04 |
| CN | 101377166 A | 3/2009 | ............. F02D 41/04 |

(Continued)

OTHER PUBLICATIONS

German Office Action, Application No. 10 2016 219 959.5, 6 pages, dated Dec. 5, 2016.

(Continued)

*Primary Examiner* — Freddie Kirkland, III
(74) *Attorney, Agent, or Firm* — Slayden Grubert Beard PLLC

(57) ABSTRACT

Various embodiments include a method for checking a calibration of a pressure sensor comprising: moving a piston toward a TDC in successive cycles; while the piston moves toward TDC, closing an inlet valve thereby adjusting a setpoint value of a fluid pressure; measuring the fluid pressure with the pressure sensor arranged downstream of the outlet valve; applying a measurement current to the electromagnet when the inlet valve is closed; while the piston moves away from TDC, detecting an opening position of the inlet valve on the basis of a predetermined change with respect to time of the measurement current at which an opening movement of the inlet valve begins; over multiple pump cycles, changing the setpoint value of the fluid pressure by a predetermined difference; checking whether the
(Continued)

change in opening position satisfies a predetermined correspondence criterion; and if the criterion is met, generating a fault signal.

10 Claims, 5 Drawing Sheets

(52) U.S. Cl.
CPC ..... *F02D 2041/223* (2013.01); *F02M 59/025* (2013.01); *F02M 59/368* (2013.01); *F02M 2200/247* (2013.01)

(58) Field of Classification Search
CPC .......... F02D 2001/0085; F02M 59/025; F02M 59/368; F02M 2200/247; G01L 27/007; G01M 15/05; G01M 15/06; G01M 15/08
See application file for complete search history.

(56) References Cited

U.S. PATENT DOCUMENTS

| | | | |
|---|---|---|---|
| 8,955,490 B2* | 2/2015 | Sahashi | F02M 57/005 123/198 D |
| 10,151,267 B2 | 12/2018 | Anetsberger et al. | |
| 10,557,445 B2* | 2/2020 | Arihara | F02D 41/38 |
| 10,731,591 B2* | 8/2020 | Chia | F02D 41/222 |
| 10,801,434 B2* | 10/2020 | Dolker | F02D 41/221 |
| 2009/0056677 A1 | 3/2009 | Nakata et al. | 123/480 |
| 2009/0063010 A1 | 3/2009 | Nakata et al. | 701/103 |
| 2017/0107931 A1* | 4/2017 | Anetsberger | F02D 41/3836 |

FOREIGN PATENT DOCUMENTS

| | | | | |
|---|---|---|---|---|
| DE | 196 33 156 A1 | 2/1998 | ............ | F02D 41/00 |
| DE | 10 2008 002 240 A1 | 12/2009 | ............ | F02D 41/22 |
| DE | 10 2010 064 048 A1 | 6/2012 | ............ | F02D 1/00 |
| DE | 10 2012 223 645 B3 | 2/2014 | ............ | F02D 41/00 |
| DE | 10 2013 213 698 A1 | 1/2015 | ............ | F02D 41/38 |
| DE | 10 2014 206 442 A1 | 10/2015 | ............ | F02D 41/38 |
| JP | 2008286160 A | 11/2008 | ......... | F02D 41/06 |
| WO | 2018/068904 A1 | 4/2018 | ............ | F02D 41/20 |

OTHER PUBLICATIONS

International Search Report and Written Opinion, Application No. PCT/EP2017/061184, 26 pages, dated Jul. 28, 2017.

* cited by examiner

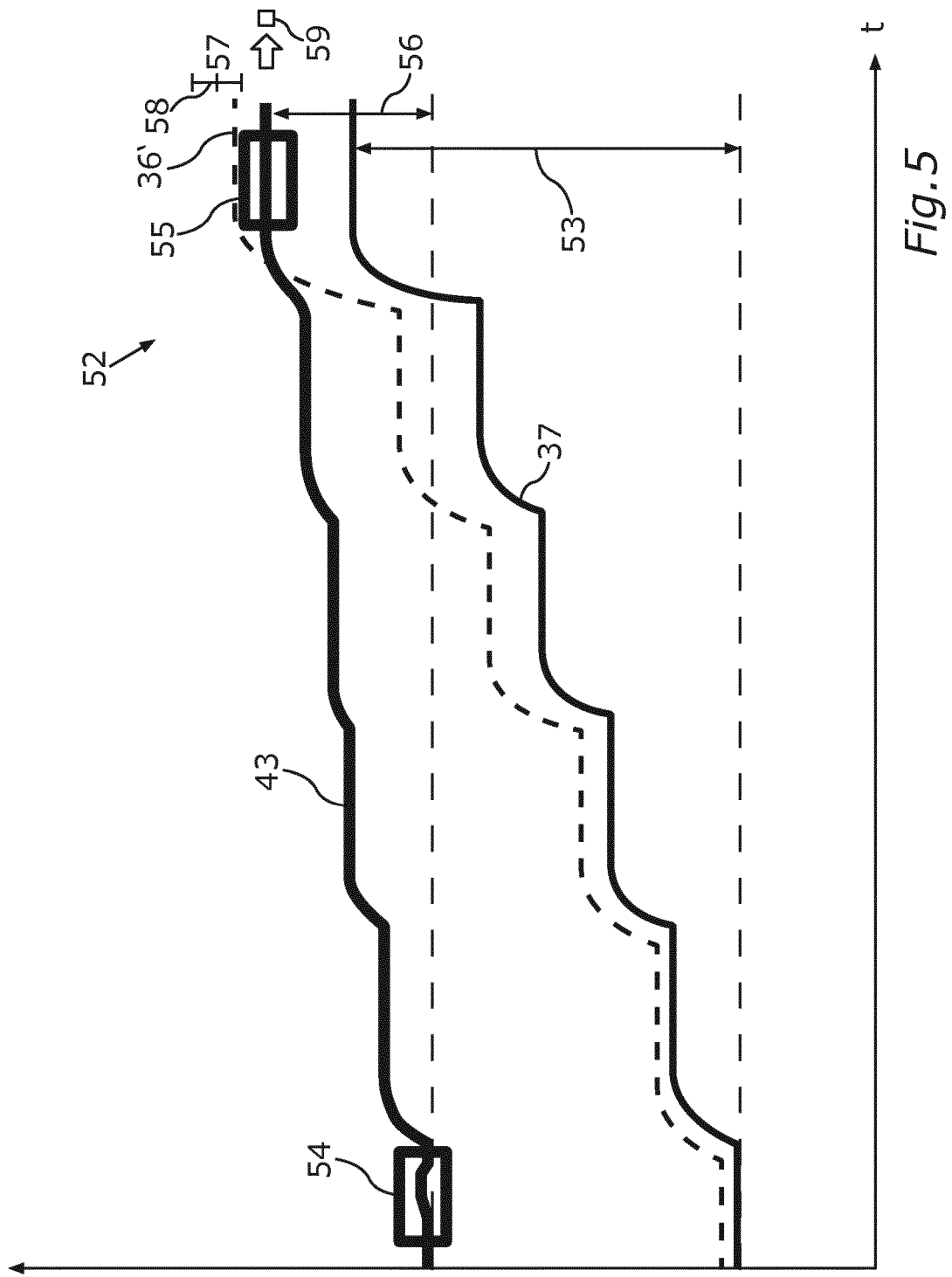

CALIBRATION OF A PRESSURE SENSOR OF AN INJECTION SYSTEM FOR A MOTOR VEHICLE

CROSS-REFERENCE TO RELATED APPLICATIONS

This application is a U.S. National Stage Application of International Application No. PCT/EP2017/061184 filed May 10, 2017, which designates the United States of America, and claims priority to DE Application No. 10 2016 219 959.5 filed Oct. 13, 2016, the contents of which are hereby incorporated by reference in their entirety.

TECHNICAL FIELD

The present disclosure relates to motor vehicles. Various embodiments may include methods and/or systems for checking a pressure sensor such as may be provided in a high-pressure injection system of an internal combustion engine of a motor vehicle.

BACKGROUND

In a motor vehicle, a fuel for an internal combustion engine can be conveyed or pumped by means of a high-pressure injection system. A high-pressure injection system of this kind has a high-pressure pump which can convey the fuel toward the internal combustion engine on a high-pressure side with a pressure of greater than 200 bar. The fuel pump can have a piston which is moved back and forth between a bottom dead center and a top dead center in a compression chamber or swept volume. To this end, the piston can be driven, for example, by an engine shaft of the internal combustion engine. A complete cyclical movement of the piston is referred to as the pump cycle here.

As part of the piston movement from the top dead center to the bottom dead center, an opening movement of an inlet valve of the high-pressure pump begins, in each pump cycle, starting from a specific opening position of the piston. This is then the beginning of an intake phase in which fuel or, in general, a fluid flows into the compression chamber through the inlet valve. After the bottom dead center is reached, the intake phase ends and the piston is moved back toward the top dead center. During this expulsion phase, the fluid is expelled from the compression chamber again by the movement of the piston toward the top dead center. Provided that the inlet valve is open in this case, the fluid flows back to a low-pressure side through the inlet valve. Therefore, the inlet valve is closed by a control device by current being applied to an electromagnet during the movement of the piston toward the top dead center. This occurs at a piston position which is dependent on a setpoint value for the fluid pressure to be adjusted to on the high-pressure side. The electromagnet to which current is applied magnetically attracts an armature which is connected to the inlet valve, so that said valve is carried along. When the inlet valve is closed, the fluid is no longer expelled through the inlet valve, but rather through an outlet valve, owing to the piston movement. The outlet valve may be, for example, a non-return valve. The fluid which is expelled through the outlet valve generates the fluid pressure on the high-pressure side downstream of the outlet valve.

Downstream of the outlet valve, there is a pressure sensor which generates a sensor signal which is intended to indicate the fluid pressure. In a manner dependent on the sensor signal, the control device can then specifically set said piston position for the closing of the inlet valve, that is to say for the application of current to the electromagnet during the expulsion phase, and hereby adjust the fluid pressure to the setpoint pressure or setpoint value. This however assumes that the sensor signal of the pressure sensor correctly signals the fluid pressure. The amplitude of the sensor signal must therefore, at particular values of the fluid pressure, have a respectively corresponding amplitude value. If the calibration has altered, or if the pressure sensor has been deliberately adjusted for example for tuning purposes, then an incorrect assignment of pressure value to amplitude value is performed by the pressure sensor.

SUMMARY

The teachings of the present disclosure describe various techniques for detecting an incorrectly calibrated pressure sensor in a high-pressure injection system. For example, some embodiments include a method for checking a calibration of a pressure sensor (35) of a high-pressure injection system (13) for an internal combustion engine (11) of a motor vehicle (10), wherein, in a compression chamber (33) of the high-pressure pump (15), a piston (22) is, in successive pump cycles, in each case during an expulsion phase, moved to a top dead center (31), and a fluid (14) arranged in the compression chamber (33) is thus expelled out of the compression chamber (33), and, during the movement of the piston (22) toward top dead center (31), the inlet valve (16) is closed by a control device (17) by current being applied to an electromagnet (18) in order to adjust a setpoint valve (37) of a fluid pressure (P), and the fluid (14) is hereby redirected through an outlet valve (26) and the fluid (14) generates the fluid pressure (P) downstream of the outlet valve (26), wherein the pressure sensor (35) is arranged downstream of the outlet valve (26) and generates a sensor signal (36, 36', 36"), characterized in that, by means of the control device (17), when the inlet valve (16) is closed, a measurement current (47) is applied to the electromagnet (18), and, while the piston (22) is again moved away from top dead center (31), on the basis of a predetermined change with respect to time (50) of the measurement current (47), an opening position (43) of the piston (22) is detected at which an opening movement of the inlet valve (16) begins, and, over multiple pump cycles, the setpoint value (37) of the fluid pressure (P) is changed by a predetermined difference value (53) and, here, it is checked whether a determined change (56) of the opening position (43) in relation to the changed setpoint value (37) satisfies a predetermined correspondence criterion (52), and, if the correspondence criterion (52) is infringed, a fault signal (59) relating to the calibration is generated.

In some embodiments, the difference value (53) is assigned a predetermined expected value (57) for the change (56) of the opening position (43), and the correspondence criterion (52) comprises that the determined change (56) of the opening position (43) lies within a tolerance interval (58) around the expected value (57).

In some embodiments, a change of the fluid pressure (P) by more than 400 bar is effected by means of the difference value (53).

In some embodiments, the change (56) of the opening position (43) is detected as a relative change.

In some embodiments, the correspondence criterion (52) is set in a manner dependent on a temperature of the fluid (14).

In some embodiments, a current intensity of the measurement current (47) is set to be lower than is provided for the closing of the inlet valve (16).

In some embodiments, the predetermined change with respect to time (50) of the measurement current (57) for the detection of the opening movement comprises that a predetermined mean value (48) of the measurement current (47) increases.

In some embodiments, the opening position (43) is ascertained by means of a rotational position sensor (44) of the internal combustion engine (11).

As another example, some embodiments include a control device (17) for a high-pressure injection system (13) of an internal combustion engine (11) of a motor vehicle (10), wherein the control device (17) is configured to close an inlet valve (16) of a high-pressure pump (15) of the high-pressure injection system (13) in a manner dependent on a sensor signal (36, 36', 36") of a pressure sensor (35), characterized in that the control device (17) is configured to carry out the steps, relating to the control device (17), of a method as described above.

As another example, some embodiments include a high-pressure injection system (13) for a motor vehicle (10), having a high-pressure pump (15) and having a pressure sensor (35) which is arranged downstream of an outlet valve (26) of the high-pressure pump (15), characterized in that the high-pressure injection system (13) has a control device (17) as described above.

As another example, some embodiments include a motor vehicle (10) comprising an internal combustion engine (11) and a high-pressure injection system (13) as described above.

BRIEF DESCRIPTION OF THE DRAWINGS

An exemplary embodiment of the teachings herein is described below. To that end, in the figures:

FIG. 5 shows a trace of a setpoint change with respect to time during multiple pump cycles.

DETAILED DESCRIPTION

Figure 1:
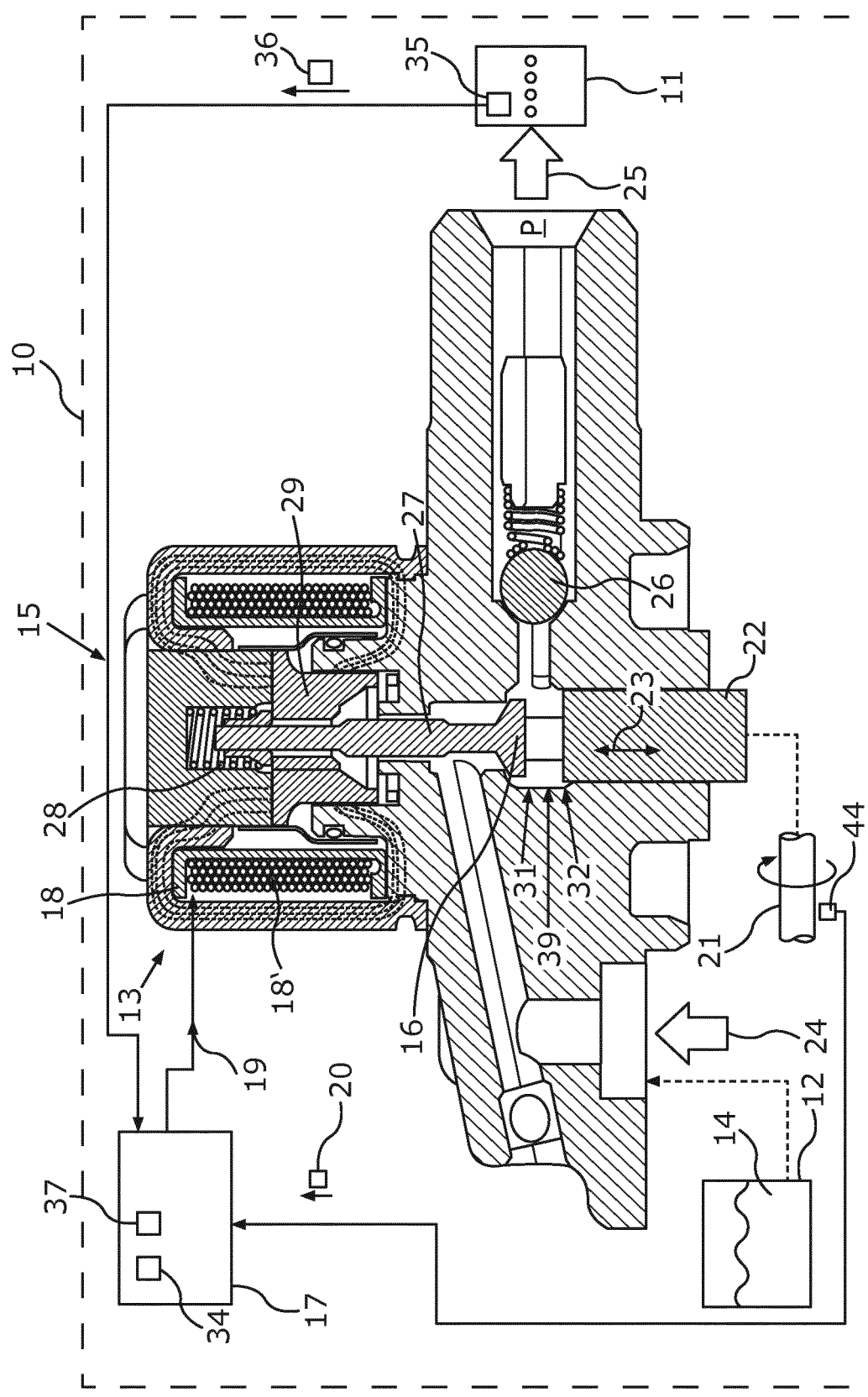
FIG. 1 shows a schematic illustration of an embodiment of the motor vehicle incorporating teachings of the present disclosure.

In some embodiments, a method starts at the point after the inlet valve has been closed by the control device in order to redirect the fluid through the outlet valve. After the inlet valve is closed, the current can normally be switched off again by the electromagnet since enough pressure builds up in the compression chamber in order to keep the inlet valve closed. In this case, the pressure is also then high enough when the piston, after reaching the top dead center, is moved away from said top dead center again and toward the bottom dead center. This is due to the fact that, in the compression chamber, the remaining fluid or fluid still present is elastically compressed while the piston is at the top dead center. If the piston moves away from the top dead center, the fluid initially expands, but it still exerts a sufficiently high pressure on the inlet valve in order to keep said inlet valve closed. The opening movement of the inlet valve therefore begins only when the piston has already moved away from the top dead center and has reached said opening position which is specifically distinguished in that the pressure in the compression chamber has become lower than a pressure force which is exerted on the inlet valve by a valve spring of the high-pressure pump and by the fluid of the low-pressure side which is located upstream on the other side of the inlet valve.

In some embodiments, a measurement current is now nevertheless applied to or caused to flow through the electromagnet by the control device with the inlet valve closed, even though this is not necessary for keeping the inlet valve closed. While the piston is moved away from the top dead center, on the basis of a predetermined change with respect to time of said measurement current, the opening position of the piston is detected, that is to say that position of the piston at which the opening movement of the inlet valve toward its open position begins. The measurement current changes because the movement of the inlet valve also moves the armature of the electromagnet, and in this way an electrical voltage is induced in the coil of the electromagnet, which electrical voltage superposes an additional induction current on the applied measurement current. This detection of the change with respect to time of the measurement current is performed repeatedly over multiple pump cycles, such that the value of the opening position of the piston is ascertained for each pump cycle. A sequence of values of the ascertained opening positions is thus formed, in each case one value per pump cycle.

Here, over multiple pump cycles, the setpoint value of the fluid pressure is changed by a predetermined difference value. Thus, a setpoint value is set in each case for one or a number of the pump cycles, and a switch is then performed in single-stage or multi-stage fashion to a next setpoint value, which differs from the preceding setpoint value by the difference value. Then, the opening position is determined again for one pump cycle or for a number of pump cycles. For the set setpoint values, it is checked whether a resulting determined change of the opening position in relation to the changed setpoint value satisfies a predetermined correspondence criterion. It is thus checked whether a change of the setpoint value corresponds to a change of the opening position. In some embodiments, the correspondence criterion describes the expected relationship or the expected change. If the correspondence criterion is infringed, this means that the opening position has changed in a manner different to that which would have to have been effected by the setpoint value. If the correspondence criterion is infringed, a fault signal relating to the calibration of the pressure sensor is thus generated.

In some embodiments, said opening position of the piston is dependent on the fluid pressure prevailing downstream of the outlet valve. The higher the fluid pressure, the greater the distance of the opening position from top dead center. Thus, if the fluid pressure is successfully changed in accordance with the setpoint value by means of the high-pressure pump, it would be necessary firstly for the sensor signal to correspondingly change. Secondly, however, the opening position is also shifted or changed with the changed fluid pressure. This is correspondingly indicated by the value sequence of the ascertained opening positions. The value sequence thus describes the profile with respect to time of the fluid pressure. By comparing the value sequence or a trend or a profile with respect to time of the value sequence with the sensor signal, it is thus possible to check whether the sensor signal has a profile with respect to time whose form corresponds with the form of the profile with respect to time of the value sequence. If this is not the case, then this indicates that the profile with respect to time of the fluid pressure is not being described by the sensor signal. A fault signal must thus be generated.

In some embodiments, if a switch is performed from a first setpoint value to a second setpoint value, the control device adjusts a value of the fluid pressure. Here, if the opening position does not correspondingly change from a first opening position to a second opening position predefined by the correspondence criterion, the sensor signal of the pressure sensor does not indicate the change of the fluid pressure that has been effected by the setpoint value change. The change in amplitude of the setpoint value signal thus does not reflect the change in the setpoint value by the difference value. This corresponds to an incorrect calibration.

On the basis of the magnitude of the difference value, it is possible to predict the distance or travel by which the opening position would have to change. The difference value may be assigned a predetermined expected value for the change of the opening position. The correspondence criterion correspondingly comprises that the determined change of the opening position, that is to say the displacement or the displacement travel, lies within a tolerance interval around the expected value. By means of the tolerance interval, it is possible for noise or a fluctuation or variation of the opening position owing to a disturbing influence to be taken into consideration or compensated. The tolerance interval is defined by two limit values, one of which is higher than the expected value and one of which is lower than the expected value. The tolerance interval may be determined on the basis of simple tests for a given structural type of the high-pressure injection system and/or engine type of an internal combustion engine.

In some embodiments, a change of the fluid pressure by more than 400 bar may be effected by means of the difference value. In this way, it is reliably possible to distinguish between noise in the measurement of the opening position, on the one hand, and an actual change of the opening position owing to a changed fluid pressure, on the other hand. Here, the difference value may be set in single-stage fashion in a single change of the setpoint value. It may also be built up in stepwise fashion in order to hereby mechanically protect the high-pressure injection system. In the determination of the opening position, it is not necessary to specify an absolute value for a distance of the opening position for example to the top dead center. It is sufficient for the change of the opening position to be detected as a relative change. This eliminates the need for cumbersome calibration of the measurement process.

The opening position is dependent, at the given fluid pressure, on the modulus of elasticity of the fluid. In some embodiments, the correspondence criterion may be set in a manner dependent on a fluid temperature. In this way, a temperature-induced change of the modulus of elasticity can be taken into consideration.

As already stated, after the closure of the inlet valve, it is no longer necessary for current to be applied to the electromagnet of the high-pressure pump, because the pressure in the compression chamber holds the inlet valve closed until such time as the piston has reached the opening position. In order that the normal operation of the control device is not impaired by the measurement current, the measurement current should not artificially shift the opening position as a result of the inlet valve being held closed by the measurement current. In some embodiments, a current intensity of the measurement current to be set to be lower than is provided for the closing of the inlet valve. The measurement current thus differs from the closing current provided for closing the inlet valve.

In some embodiments, the opening movement of the inlet valve generates an induction current in the electrical coil of the electromagnet, which induction current is superposed on that component of the measurement current which is imparted by the control device. The result is an increase of the measurement current. To detect the opening movement, it is therefore checked whether a predetermined mean value of the measurement current increases. If the measurement current imparted by the control device is set for example by means of pulse width modulation, a mean value obtained is for example the value of the measurement current that can be formed over one or two or more than two periods of the pulse width modulation.

In order, in the event of an opening movement being detected, to describe the opening position of the piston with one value, the opening position may be ascertained by means of a rotational position sensor of the internal combustion engine. It is thus possible to ascertain the rotational position of the engine shaft that drives the piston. The rotational position value is sufficiently informative. An absolute distance value of the opening position in relation to top dead center is not necessary. It is sufficient to ascertain a relative change of the opening position and thus of the rotational position in order to identify a defective pressure sensor in the described manner.

In some embodiments, a control device for a high-pressure injection system of an internal combustion engine of a motor vehicle is configured to implement the methods herein. The control device is configured to, in the described manner, close the inlet valve of the high-pressure pump of the high-pressure injection system in a manner dependent on the sensor signal of the pressure sensor in order to adjust the fluid pressure to a setpoint value. The control device is designed to implement the described method steps of the control device incorporating teachings of the present disclosure.

In the figures, the described components of the embodiment each constitute individual features of the teachings herein which should be considered independently of one another and which in each case also develop the teachings independently of one another and should therefore also be regarded as a constituent part individually or in a different combination to that shown. Furthermore, the embodiment described is also able to be supplemented by further features of the teachings from among those that have already been described. In the figures, functionally identical elements are provided in each case with the same reference signs.

FIG. 1 shows a motor vehicle 10, which may be, for example, an automobile, such as a passenger car or truck for example. The motor vehicle 10 may have an internal combustion engine 11 which can be coupled to a fuel tank 12 by means of a high-pressure injection system 13. A fluid 14 which is contained in the fuel tank 12, that is to say a fuel for example, such as diesel or petrol for example, can be conveyed to the internal combustion engine 11 by means of the high-pressure injection system 13. To this end, the high-pressure injection system 13 can have a high-pressure pump 15 comprising an inlet valve 16 and a control device 17 for controlling an electromagnet 18 of the inlet valve 16. The control device 17 can adjust a coil current 19 which flows through an electrical coil 18' of the electromagnet 18.

The control device 17 can adjust the coil current 19 depending on a rotational position signal 20 which describes or signals a rotational position of an engine shaft 21 of the motor vehicle 10. The engine shaft 21 can be coupled, for example, to a crankshaft of the internal combustion engine 11. The engine shaft 21 may also be the crankshaft itself. A piston 22 of the high-pressure pump 15 is also driven by the engine shaft 21 to perform a piston movement 23 in a compression chamber 33. The piston movement 23 moves the piston back and forth between a top dead center 31 and a bottom dead center 32 in pump cycles. The fluid 14 is conveyed from a low-pressure side, which is at a low pressure 24, of the high-pressure pump 15 to a high-pressure side, which is at a high pressure 25, by the piston movement 23 of the piston 22. In the process, the fluid 14 flows through the inlet valve 16 and an outlet valve 26.

In the process, a pin 27 of the inlet valve 16 is moved by means of the coil current 19 by current being applied to the coil 18' of the electromagnet 18. In this case, a valve spring 28 counteracts the magnetic force of the electromagnet 18 and in this way pushes the pin 27 toward an open position, as is shown in FIG. 1. By adjustment of the coil current 19, the spring force of the valve spring 28 is overcome and an armature 29 with the pin 27 fastened to it is moved counter to the spring force of the valve spring 28, and the inlet valve 16 is closed in this way.

The respective time at which the control device 17 closes the inlet valve 16 by applying current to the electromagnet 18 in each pump cycle is defined by a regulator 34 of the control device 17, which regulator can receive a sensor signal 36 from a pressure sensor 35, which sensor signal signals a current fluid pressure of the fluid in a part of the high-pressure injection system 13 which is positioned downstream of the outlet valve 16. Therefore, a fluid pressure P of the high-pressure side 25 is signaled by the pressure sensor 35 and the control device 17 can adjust the fluid pressure P to a setpoint value 37 by adjusting the time for closing the inlet valve 16. However, this assumes that the sensor signal 36 actually corresponds to the fluid pressure P.

Figure 2:
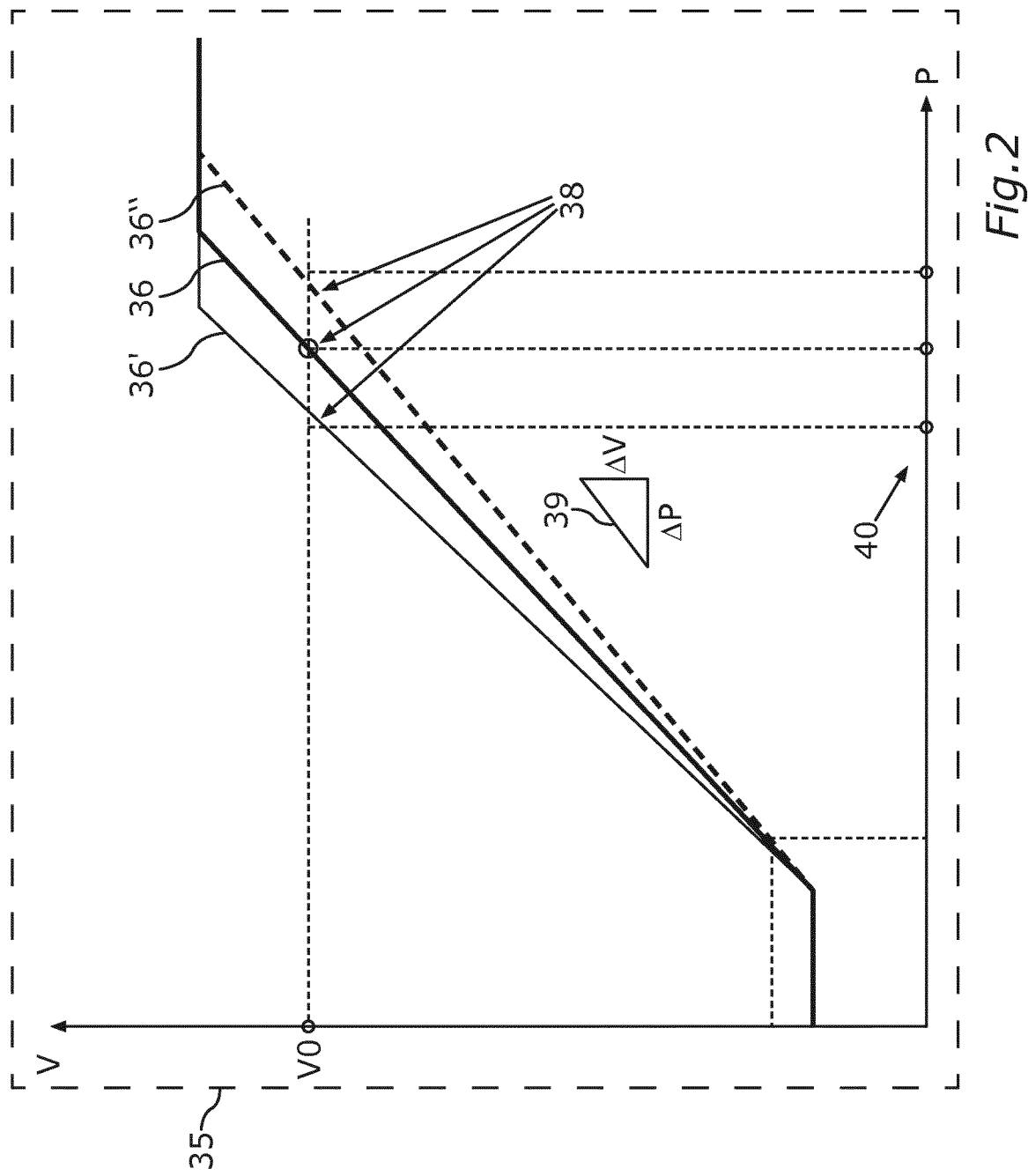
FIG. 2 shows diagrams with schematic profiles of a sensor signal such as may arise in the case of different calibration settings of a pressure sensor of the motor vehicle of FIG. 1.

FIG. 2 illustrates how, by means of the pressure sensor 35, an amplitude V of the sensor signal 36 can be set in a manner dependent on the fluid pressure P. The illustration shows 3 possible characteristic curves 38 of the pressure sensor 35, which each have a different gradient 39. The gradient 39 is determined as a change ΔV of the amplitude V as a function of a change ΔP of the fluid pressure P. If the pressure sensor 35 has been correctly calibrated, the result is, in the illustrated example, the sensor signal 36. In the case of too steep a gradient 39, the result may be the sensor signal 36'. In the case of too shallow or too low a gradient 39, the result may be the sensor signal 36". Correspondingly, an amplitude value V0, which can be received by the control device 17, can be interpreted in each case as a different pressure value 40 of the fluid pressure P.

If it is now the intention for the control device 17 to adjust a fluid pressure P to a predefined setpoint value 37, the result is an offset of the actually adjusted fluid pressure P as a function of the gradient 39 and as a function of the absolute value of the fluid pressure P. If it is assumed that, during the production and during the installation of the pressure sensor 35 into the motor vehicle 10, a correctly calibrated pressure sensor 35 is present which generates the sensor signal 36, then it is possible in the motor vehicle 10 at a later point in time to check whether the calibration remains correct or whether the pressure sensor 35 generates a sensor signal 36' with too steep a gradient 39 or a sensor signal 36" with too shallow a gradient 39. This check is performed on the basis of the described opening position of the piston 22.

Figure 3:
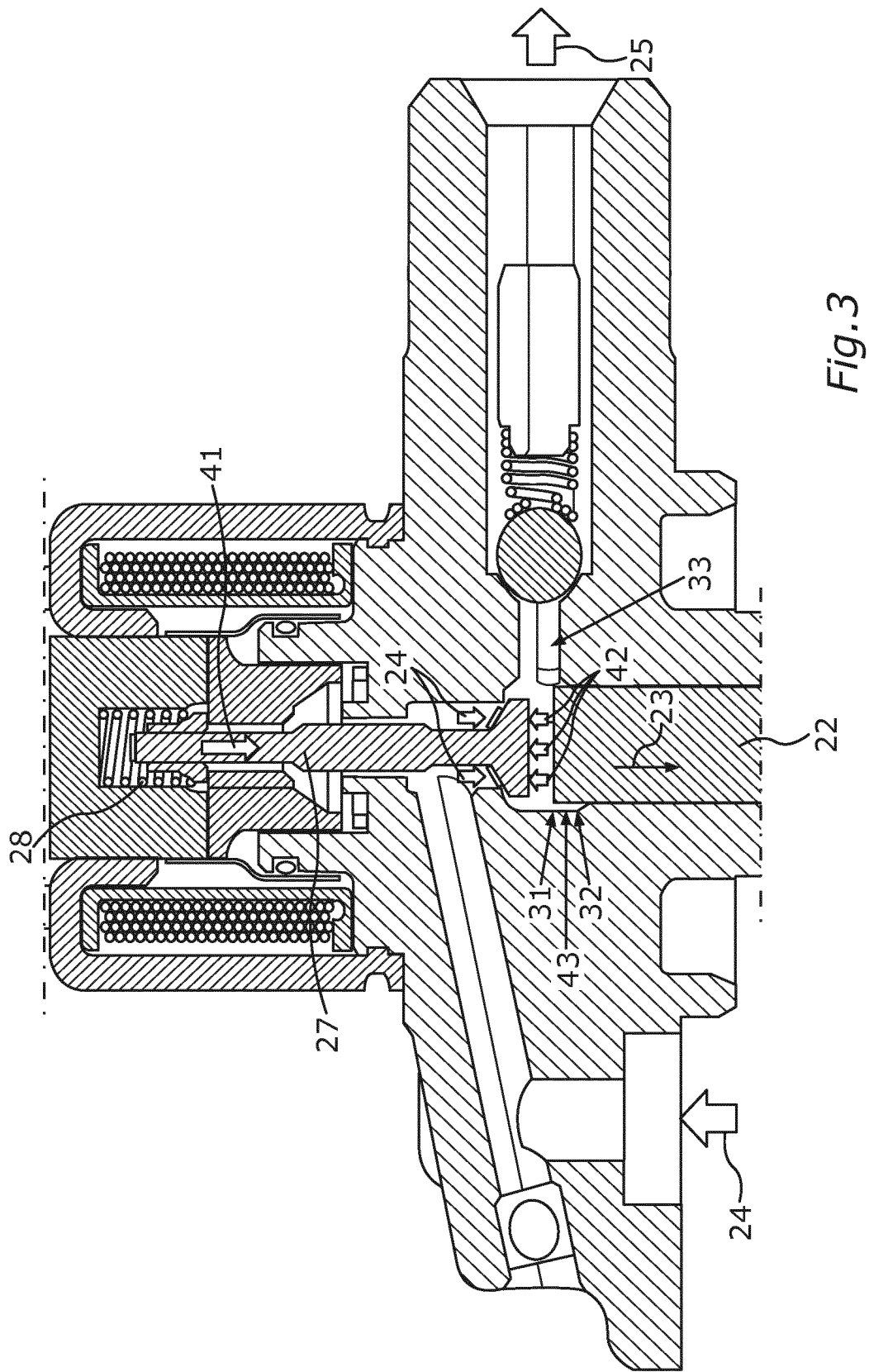
FIG. 3 shows a schematic illustration of a high-pressure pump of the motor vehicle from FIG. 1.

FIG. 3 illustrates the underlying measurement principle. To this end, FIG. 3 shows how the pin 27 is held in the illustrated closed position of the inlet valve 16 even when there is no coil current 19 flowing. The reason for this is that the low pressure 24 together with a spring force 41 of the valve spring 28 is lower than a pressure force 42 of the compressed fluid 14 in the compression chamber 33 even after the top dead center 31 is overshot. The piston 22 first has to reach a predetermined opening position 43 between the top dead center 31 and the bottom dead center 32, so that the fluid 14 in the compression chamber 33 is expanded to a sufficient extent that the pressure in the compression chamber 33 produces a pressure force 42 which is low enough to move the pin 27 from the closed position, shown in FIG. 3, toward the open position, shown in FIG. 1, by means of the spring force 41 and the low pressure 24.

Figure 4:
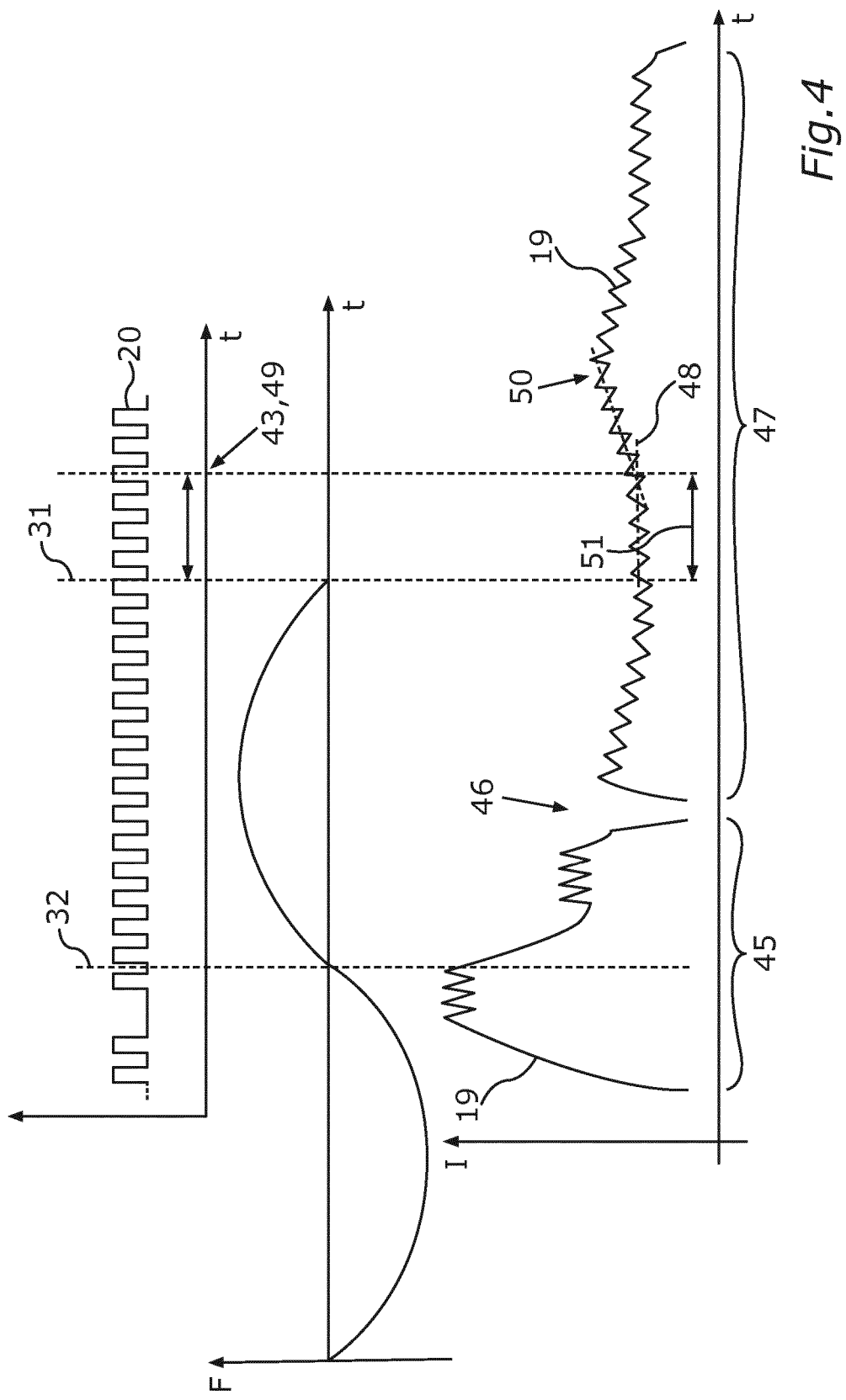
FIG. 4 shows diagrams with schematic profiles of signals as can be ascertained by means of a control device in the motor vehicle of FIG. 1.

FIG. 4 shows how, firstly, the starting of this opening movement of the inlet valve 16, that is to say of the pin 27 of said inlet valve, can be identified by the control device 17 and how, secondly, starting from this point, it is possible to infer the associated opening position 43. Here, FIG. 4 illustrates, versus the time t, firstly the fluid flow F, the rotational position signal 20 which can be generated by a rotational position encoder 44 for example as a pulse sequence, and a profile with respect to time of the coil current 19. In the example illustrated in FIG. 4, it is assumed that there should be no return flow through the inlet valve 16, but rather that the inlet valve 16 is closed at the bottom dead center 32 by adjustment of a current profile 45 for the coil current 19. The current profile 45 yields a closing current. This situation arises if the control device 17 seeks, on the basis of a difference between the sensor signal 36 and the setpoint value 37, to adjust the fluid pressure P to the setpoint value 37 with a maximum rate of change.

After the ending of the current profile 45, the coil current 19 can be switched off in a switching interval 46. The coil current 19 can then be switched on again with a measurement profile 47 by the control device 17 while the inlet valve 16 is still closed, wherein the measurement profile 42 produces a current intensity I which is lower than the current intensity I of the current profile 45 for closing the inlet valve 16. A measurement current therefore results.

After the top dead center 31 has been passed by the piston 22, a mean value 48 of the current intensity I of the coil current 19 remains constant or within a predetermined tolerance range until such time as a starting of the opening movement of the pin 27 of the inlet valve 16 occurs at a start time 49. The piston has then reached its present opening position 43. At the opening position 43, a force balance is equalized as described in FIG. 3. In other words, the inlet valve 16 opens at the start time 49 when the spring force 38 and the hydraulic force of the low-pressure side, which is at a low pressure 24, together are greater than the hydraulic pressure force 42 in the compression chamber 33. This occurs when the pressure in the compression chamber 33, that is to say in the free dead volume of said compression chamber, has reduced owing to the piston movement 23 in the direction of the bottom dead center 32.

The opening movement of the pin 27 and of the armature 29 induces an additional induction current in the electrical coil 18', this additional induction current leading to an increase 50 in the effective value or mean value 48. The start of this increase 50 constitutes a predetermined or known change with respect to time. By comparing the mean values 48 of successive times, it is possible, by means of the control device 17, to detect the starting time 49 at which the piston is in the opening position 43. The starting time 49 may be specified as an angular value of the rotational position signal 20. The starting time 49 is thus a description of the opening position 43 of the piston. A distance 51 of the opening position 49 from the top dead center 31 is dependent on the fluid pressure P. Without the need for the distance 51 to be known precisely, a relative change of the opening position 43 and thus of the start time 49 is sufficient to identify a change of the fluid pressure P.

FIG. 5 illustrates how, from this, a correspondence criterion 52 between the opening position 43 and the sensor signal 36 can be defined, on the basis of which it can be checked whether the pressure sensor 35 has a correct characteristic curve 38, that is to say is correctly calibrated. FIG. 5 shows, versus the time t, a change with respect to time, or a profile with respect to time, of the setpoint value 37 during multiple pump cycles, wherein, in each case after a number of pump cycles, the setpoint value 37 is changed in stepwise fashion, resulting overall in a delta value 53. The question is now whether the sensor signal 36 is generated with the correct characteristic curve 38 or, as illustrated as an example in FIG. 5, the sensor signal 36', for example, is generated owing to too steep a gradient 39.

For this purpose, during the pump cycles, a value of the opening position 43 is determined in each case in the described manner, resulting overall in the profile with respect to time, or a change, of the opening position 43 in reaction to the change of the setpoint value 37. Altogether, for the start and for the end of the measurement, it is possible altogether to determine, from a starting value 54 and from an end value 55, a change 56 of the opening position 43 in the case of a change of the setpoint value 37 by the difference value 53. For a given difference value 53, it is possible to define an expected value 57 and a tolerance interval 58 that includes said expected value, in which tolerance interval the end value 55 must lie if the characteristic curve 38 for a correctly calibrated pressure sensor, which thus generates the sensor signal 36, is present. It is to be noted in FIG. 5 that the graph of the opening position 43 must lie in the tolerance interval 58.

In the present case, the gradient 39 is, by way of example, too steep (sensor signal 36'), such that the closed-loop controller 35 sets a relatively low fluid pressure P and the opening position 43 is thus displaced to a lesser extent than that provided by the tolerance interval 58. Correspondingly, it is thus possible for a fault signal 59 to be generated which signals the incorrect calibration of the pressure sensor 35.

What is claimed is:

1. A method for checking a calibration of a pressure sensor of a high-pressure injection system for an internal combustion engine, the method comprising:
moving a piston within a compression chamber of the high-pressure pump toward a top dead center in successive pump cycles during an expulsion phase to expel a fluid from the compression chamber through an outlet valve;
while the piston moves toward top dead center, closing an inlet valve by applying a current to an electromagnet thereby adjusting a setpoint value of a fluid pressure;
wherein the fluid generates the fluid pressure downstream of the outlet valve;
measuring the fluid pressure with the pressure sensor arranged downstream of the outlet valve;
applying a measurement current to the electromagnet when the inlet valve is closed;
while the piston moves away from top dead center, detecting an opening position of the inlet valve on the basis of a predetermined change with respect to time of the measurement current at which an opening movement of the inlet valve begins;
over multiple pump cycles, changing the setpoint value of the fluid pressure by a predetermined difference value;
checking whether a determined change of the opening position in relation to the changed setpoint value satisfies a predetermined correspondence criterion; and
if the correspondence criterion is met, generating a fault signal relating to the calibration.

2. The method as claimed in claim 1, further comprising:
assigning the difference value a predetermined expected value for the change of the opening position; and
wherein the correspondence criterion corresponds to the determined change of the opening position being within a tolerance interval around the expected value.

3. The method as claimed in claim 1, further comprising effecting a change of the fluid pressure by more than 400 bar by means of the difference value.

4. The method as claimed in claim 1, wherein the change of the opening position corresponds to a relative change.

5. The method according to claim 1, wherein the correspondence criterion depends on a temperature of the fluid.

6. The method as claimed in claim 1, further comprising setting a current intensity of the measurement current lower than the current intensity for the closing the inlet valve.

7. The method as claimed in claim 1, wherein the predetermined change with respect to time of the measurement current for the detection of the opening movement corresponds to an increase in the predetermined mean value of the measurement current.

8. The method as claimed in claim 1, wherein detecting the opening position includes monitoring a rotational position sensor of the internal combustion engine.

9. A control device for a high-pressure injection system of an internal combustion engine of a motor vehicle, the control device comprising:
a processor and a memory storing a set of instructions, the set of instructions, when loaded and executed by the processor, causing the processor to:
close an inlet valve of a high-pressure pump of the high-pressure injection system based at least in part on a sensor signal of a pressure sensor;
move a piston within a compression chamber of the high-pressure pump toward a top dead center in successive pump cycles during an expulsion phase to expel a fluid from the compression chamber through an outlet valve;
while the piston moves toward top dead center, close an inlet valve by applying a current to an electromagnet thereby adjusting a setpoint value of a fluid pressure, wherein the fluid generates the fluid pressure downstream of the outlet valve;
measure the fluid pressure with the pressure sensor arranged downstream of the outlet valve;
apply a measurement current to the electromagnet when the inlet valve is closed;
while the piston moves away from top dead center, detect an opening position of the inlet valve on the basis of a predetermined change with respect to time of the measurement current at which an opening movement of the inlet valve begins;
over multiple pump cycles, change the setpoint value of the fluid pressure by a predetermined difference value;

check whether a determined change of the opening position in relation to the changed setpoint value satisfies a predetermined correspondence criterion; and if the correspondence criterion is met, generate a fault signal relating to the calibration.

10. A high-pressure injection system for a motor vehicle, the system comprising:

a high-pressure pump having an outlet valve;

a pressure sensor arranged downstream of the outlet valve;

a processor and a memory storing a set of instructions, the set of instructions, when loaded and executed by the processor, causing the processor to:

close an inlet valve of a high-pressure pump of the high-pressure injection system based on the sensor signal;

move a piston within a compression chamber of the high-pressure pump toward a top dead center in successive pump cycles during an expulsion phase to expel a fluid from the compression chamber through an outlet valve;

while the piston moves toward top dead center, close an inlet valve by applying a current to an electromagnet thereby adjusting a setpoint value of a fluid pressure, wherein the fluid generates the fluid pressure downstream of the outlet valve;

measure the fluid pressure with the pressure sensor arranged downstream of the outlet valve;

apply a measurement current to the electromagnet when the inlet valve is closed;

while the piston moves away from top dead center, detect an opening position of the inlet valve on the basis of a predetermined change with respect to time of the measurement current at which an opening movement of the inlet valve begins;

over multiple pump cycles, change the setpoint value of the fluid pressure by a predetermined difference value;

check whether a determined change of the opening position in relation to the changed setpoint value satisfies a predetermined correspondence criterion; and if the correspondence criterion is met, generate a fault signal relating to the calibration.

* * * * *